T. D. AYLESWORTH.
Harvester Cutter.
No. 25,312.
Patented Sept. 6, 1859.
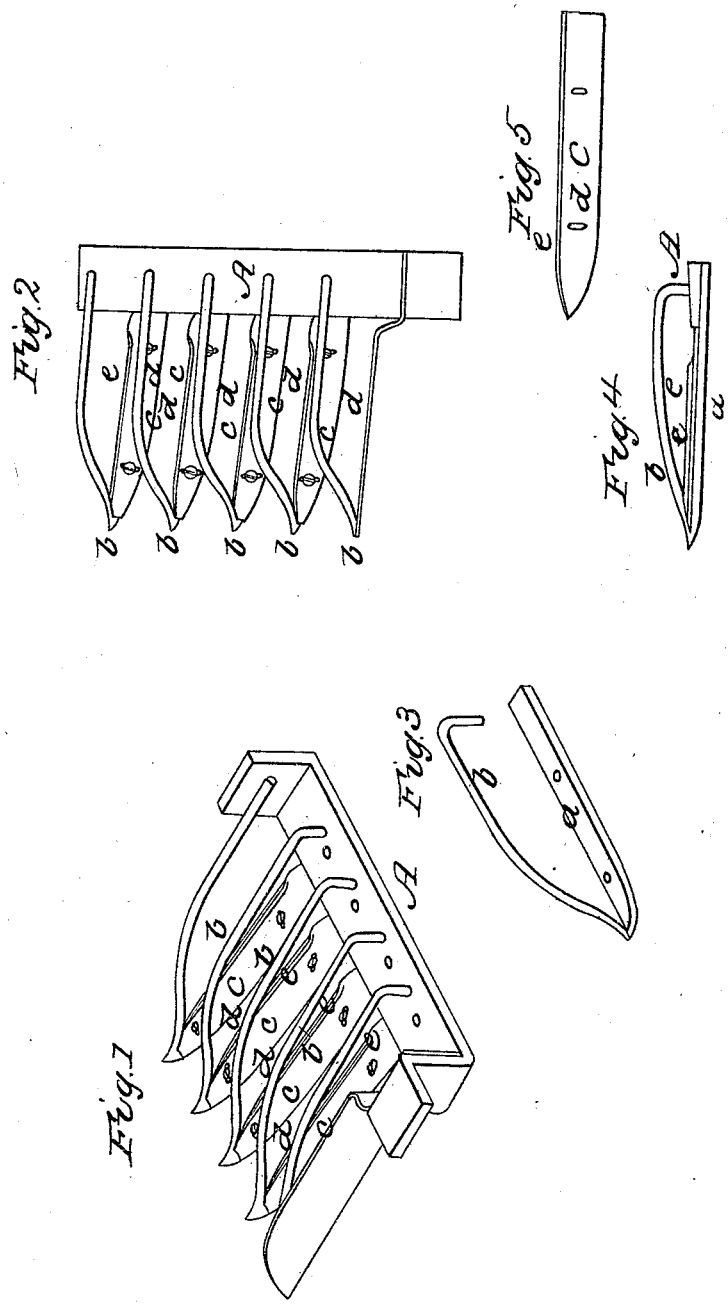

UNITED STATES PATENT OFFICE.

THOMAS D. AYLESWORTH, OF ILION, NEW YORK.

IMPROVEMENT IN THE CUTTING APPARATUS OF HARVESTERS.

Specification forming part of Letters Patent No. 25,312, dated September 6, 1859.

*To all whom it may concern:*

Be it known that I, THOMAS D. AYLESWORTH, of Ilion, in the county of Herkimer and State of New York, have invented certain new and useful Improvements in the Cutting Apparatus of Harvesting-Machines; and I do hereby declare the following to be a full, clear, and exact description of the construction and operation of the same, reference being had to the accompanying drawings, making a part of this specification, in which—

Figure 1 represents in perspective the cutters and guards and their connection to each other and to the cutter, finger, or platform bar. Fig. 2 represents a top plan of the same. Figs. 3, 4, and 5 represent detached portions of the cutting and gathering apparatus, guards, &c., which will be hereinafter more especially referred to.

Similar letters of reference, where they occur in the separate figures, denote like parts of the apparatus in all of them.

I am aware that an inclined knife has been proposed to be drawn across the field to cut standing grass or grain; but owing to the want of some means for gathering in or holding the material to be cut against the cutters, so that they might sever it, such a cutting device was found impracticable. Knives, too, that had no motion except that which they received from the machine as it was moved over the ground—that is, no geared motion—have been used in connection with rotating reels or gatherers for bringing the materials in contact with the knives, and thus severing them. These knives are termed "stationary knives," because they have neither a rotary, reciprocating, nor any geared motion. They move, however, with the machine. To such knives or cutters and gatherers as those above mentioned I lay no claim.

My object is to so construct cutters or cutting-edges and guards or gatherers as that by simply advancing or drawing the machine to which they are connected over the field the crop shall be cut, and thus avoid all gearing, though a reel may be used for drawing the standing or leaning grass or grain within the action of the guards and cutters by which it is finally severed. Geared motion is not applied to either the cutters or the gatherers or guards, and yet the grass or grain is held against the action of the cutters, so that the advancing of the machine must sever it. The cutters which I propose to use resemble the ordinary scythe-blade, and the cutting action is somewhat similar to ordinary hand-cutting with a scythe, except that I get the "drawing cut" by the action of the guards and not by the motion of the scythe, as in hand-cutting.

My invention consists in combining with a series of blades or scythes whose cutting-edges are in the line, or nearly so, of their length, and which project forward from the cutter, finger, or platform bar, whether in a right or inclined line, a series of bows, guards, fingers, or gatherers, which are elevated above said cutters and are so inclined thereto as to bend over and against the series of cutters the stalks of grass or grain that pass in between the blades, and thus hold them, as it were, while the advancing blades or cutters sever them.

To enable others skilled in the art to make and use my invention, I will proceed to describe the same with reference to the drawings.

A may represent a cutter or finger bar or the front of the platform, to which may be bolted or otherwise fastened a series of knife-stocks, *a*, and to the points of these knife-stocks are fastened respectively the front end of a bow or guard, *b*, the rear end of which is fastened to the part or piece A. The knife-stocks *a* stand at an inclination to the bar A, while the bow or guard *b* of each is so curved that it acts in connection with the next adjacent cutter or blade to that to which it is attached, as more clearly shown in Fig. 2. To these knife-stocks *a* are secured the scythe-blades *c* by means of set-screws passing through holes or slots therein and holes in the knife-stocks, the object of the slots being for adjusting or varying the angle of the blade. This adjustment may as conveniently be made between the knife-stocks and finger or cutter bar as with the blades, the object being to vary the inclination of the cutting-edges with regard to the line of motion of the machine. These blades or scythes *c* have but one cutting-edge—viz., that *d*—the other side, *e*, of it being turned up and formed into a flange (like an ordinary scythe) to give it strength. The flat steel blades may be used, as the knife-stocks are abundantly strong to support them. These blades can be readily removed to be ground or resharpened, and the slots will allow them to be set out farther on their stocks as they are worn away.

This form of cutter and guard may be applied to any kind of a frame and pushed or pulled over the field to be harvested by horses in any of the usual ways. As it requires no gearing, it may be hitched to any wagon, truck, or sled.

The operation of the gatherers and cutters is as follows: Suppose the machine to be advanced into standing grain. The points of the guards enter the grain, separating it into sections or divisions, each of which is caught by its respective guard or bow $b$, which bends it over against the cutter, and as the stalks are fast in the ground and the cutters passing over it the cutter severs them. The stalks cannot escape from the blades, for they are bent down under the guards or bows and against the cutters in such manner that they must be severed, as every stock is forced over or past the space which the cutting-edges cover in some one point or other of their length. The inclination of the cutters may be some five or ten degrees, or more, if desired. By "cutters" I mean cutting-edges. The action of these inclined cutters and guards is like that of a shear cut, though in my case the material is brought to the shears instead of the shears to the material, as in ordinary cases, and though the inclination of the cutting-edges in part effects a "drawing cut," as it is termed, yet the draw cut is due to the guards, which bring the stalks in a curved line to the cutting-edge, and while they do this they also hold the stalks to and against the action of the cutters. I have called the pieces $b$ "bows," "guards," or "gatherers." It is immaterial what they are called so long as they effect the object—that is, the gathering, bending over, and holding the stalks while the cutter severs them.

Having thus fully described the nature and object of my invention, what I claim therein as new, and desire to secure by Letters Patent, is—

A cutting apparatus for harvesting-machines, composed substantially of the cutters $c$ and guards $b$, when constructed and operating together without any motion except that of being advanced or drawn over a field, substantially as described.

THOS. D. AYLESWORTH.

Witnesses:
W. H. THOMAS,
E. REMINGTON, Jr.